Nov. 18, 1924.                                                    1,515,920
J. AUCH
TONNEAU WINDSHIELD
Filed July 29, 1920
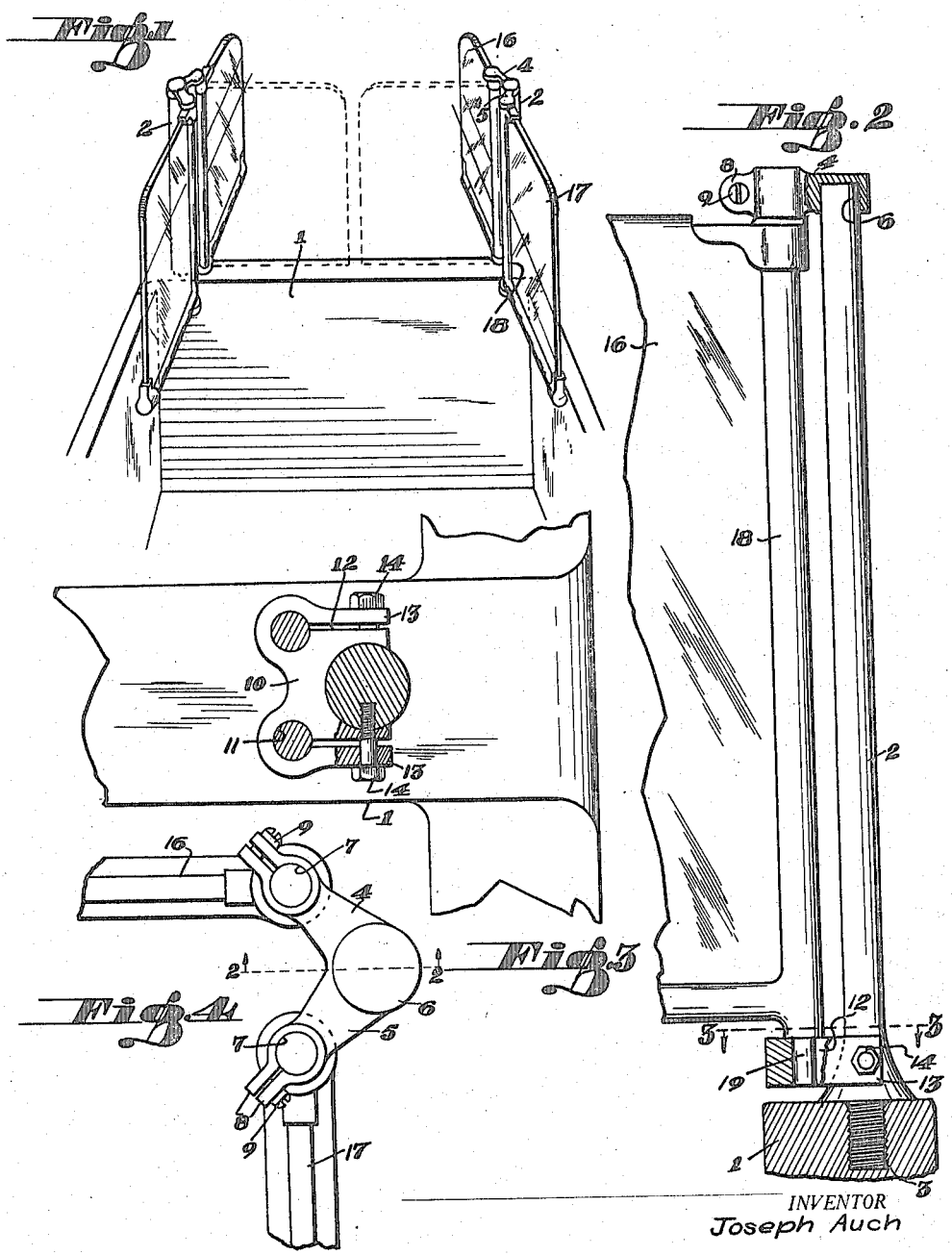
INVENTOR
Joseph Auch
BY
Hazard & Miller
ATTORNEYS Patented Nov. 18, 1924.

1,515,920

UNITED STATES PATENT OFFICE.

JOSEPH AUCH, OF PASADENA, CALIFORNIA, ASSIGNOR, BY MESNE ASSIGNMENTS, TO ARTHUR C. LILLIE, OF LOS ANGELES, CALIFORNIA.

TONNEAU WINDSHIELD.

Application filed July 29, 1920. Serial No. 399,847.

*To all whom it may concern:*

Be it known that I, JOSEPH AUCH, a citizen of France, residing at Pasadena, county of Los Angeles, State of California, have invented new and useful Tonneau Windshields, of which the following is a specification.

This invention relates to tonneau windshields, and has for its object the provision of a windshield adapted to be mounted at each side of a tonneau of a motor vehicle, each of said windshields comprising two plates independently swingably adjustable at one of their upright edges around a common supporting upright mounted upon the frame of the vehicle. One of the plates of each windshield is thus arranged to be either swung across the tonneau or forwardly or rearwardly from such position, while the other of said plates of a windshield is adapted to be swung along the side of the tonneau or outwardly therefrom to provide side deflectors.

The invention will be readily understood from the following description of the accompanying drawings, in which—

Figure 1 is a perspective view of the tonneau of an automobile having the improved windshields mounted thereon.

Fig. 2 is a longitudinal section on the line 2—2 of Fig. 4.

Fig. 3 is a transverse section on the line 3—3 of Fig. 2.

Fig. 4 is a top plan view of the supporting upright for one of the windshields.

One of the improved windshields is adapted to be mounted at each side of the tonneau of an automobile, preferably upon the top of the back 1 of the front seat. Each of the windshields comprises a supporting upright 2 which may be supported upon the back 1 by means of a threaded end 3 provided upon said upright and extending downwardly within said back. Clamping bearings are provided at the upper and lower ends of the supporting upright. The clamping bearing at the upper end of the supporting upright is shown as comprising angularly disposed bracket arms 4 and 5 having the common supporting socket 6 received over the end of the supporting upright. The ends of the respective bracket arms consist of split clamping bearings 7, the lips 8 of which are adapted to be drawn together by means of clamp screws 9.

The clamping bearing at the lower end of the supporting upright consists of a block 10 having the bearings 11 in longitudinal alinement with the respective bearings 7. The block 10 is split as shown at 12 to provide a clamping lip 13 for each of the bearings 11 and a screw bolt 14 is adapted to extend through each of the clamping lips 13 and be threaded into the supporting upright 2 in order to provide clamping means for the bearings 11.

Two windshield plates 16 and 17 are mounted upon each of the supporting uprights 2, said windshield plates being shown as supported by metallic frames which include uprights 18 at one of the upright edges of the windshield plates. Pivot pins 19 extend longitudinally beyond the respective ends of uprights 18, and the pivot pins upon each of the windshield plates 16 and 17 are adapted to be received in the respective alined pairs of bearings 7—11.

By this arrangement the windshield plates may be swung around the supporting uprights and clamped in adjusted positions by tightening screws 9 and bolts 14. The windshield plate 16 of each windshield may be swung into either the position shown in dotted lines in Fig. 1 wherein said plates of the two windshields at opposite sides of the tonneau will form a windshield extending across the tonneau, or said plates may be swung either forwardly or rearwardly from such position.

The windshield plate 17 may be positioned either lengthwise of the automobile body as shown in Fig. 1, or may be swung inwardly or outwardly from such position to form side wind deflectors.

Various changes may be made without departing from the spirit of the invention as claimed.

What is claimed is:

1. A tonneau windshield comprising a vertical support adapted to be rigidly mounted, pairs of clamping bearings at the upper and lower ends of the support, and two windshield plates having uprights extending into the clamping bearings, so that each plate is mounted to swing independently of the other and may be held independently by clamping the bearings.

2. A tonneau windshield comprising a vertical support adapted to be rigidly mounted, clamping bearings at the upper and lower ends of the vertical support, a windshield plate having an upright extending into the clamping bearings so that the plate may be swung to any desired position and held by clamping the bearings, second clamping bearings at the upper and lower ends of the support, and a second windshield plate having a second upright extending into the second clamping bearings and adapted to be swung to any desired position independently of the first plate and held by clamping the second bearings.

3. In a tonneau windshield, supporting members arranged within said tonneau adjacent to the back of the front seat, bearing blocks carried by the supporting members, a pair of windshields independently supported by each block, and means to independently and adjustably lock the windshields against movement, so as to permit either to be adjusted without disturbing the other.

4. In a tonneau windshield, supporting members arranged adjacent the back of the front seat, a pair of windshields independently supported by each member, and means to independently and adjustably lock the windshields against movement, so as to permit either to be adjusted without disturbing the other.

In testimony whereof I have signed my name to this specification.

JOSEPH AUCH.